United States Patent [19]

Minami et al.

[11] 4,078,379
[45] Mar. 14, 1978

[54] EXHAUST GAS PURIFYING SYSTEM

[76] Inventors: Hidehiro Minami, No. 1403, Matana-cho, Totsuka, Yokohama; Zen-ichiro Saito, No. 5-38, Mitsusawaminami-cho, Kanagawa, Yokohama, both of Japan

[21] Appl. No.: 666,970

[22] Filed: Mar. 15, 1976

[30] Foreign Application Priority Data

Mar. 25, 1975  Japan .................................. 5035779

[51] Int. Cl.² ...................... F02B 75/10; F02M 31/00
[52] U.S. Cl. ........................................ 60/276; 60/285; 123/122 D
[58] Field of Search ............. 60/276, 285; 123/122 D, 123/119 R, 119 EC

[56] References Cited

U.S. PATENT DOCUMENTS

| 3,444,847 | 5/1969 | King | 123/122 D |
| 3,906,910 | 9/1975 | Szlaga | 123/119 R |
| 3,913,544 | 10/1975 | Fyie | 123/122 D |

Primary Examiner—Douglas Hart
Attorney, Agent, or Firm—Robert E. Burns; Emmanuel J. Lobato; Bruce L. Adams

[57] ABSTRACT

An internal combustion engine has at the intake system thereof an electronically controlled carburetor operable to control the air-fuel ratio of the air-fuel mixture supplied into combustion chambers of the engine in accordance with the composition of the exhaust gases exhausted from the engine, and at the exhaust system thereof a three-way catalytic converter. The internal combustion engine further has at the intake system thereof a thermostatically controlled air filter system which is designed to keep the air entering the intake system at generally constant temperature.

1 Claim, 1 Drawing Figure

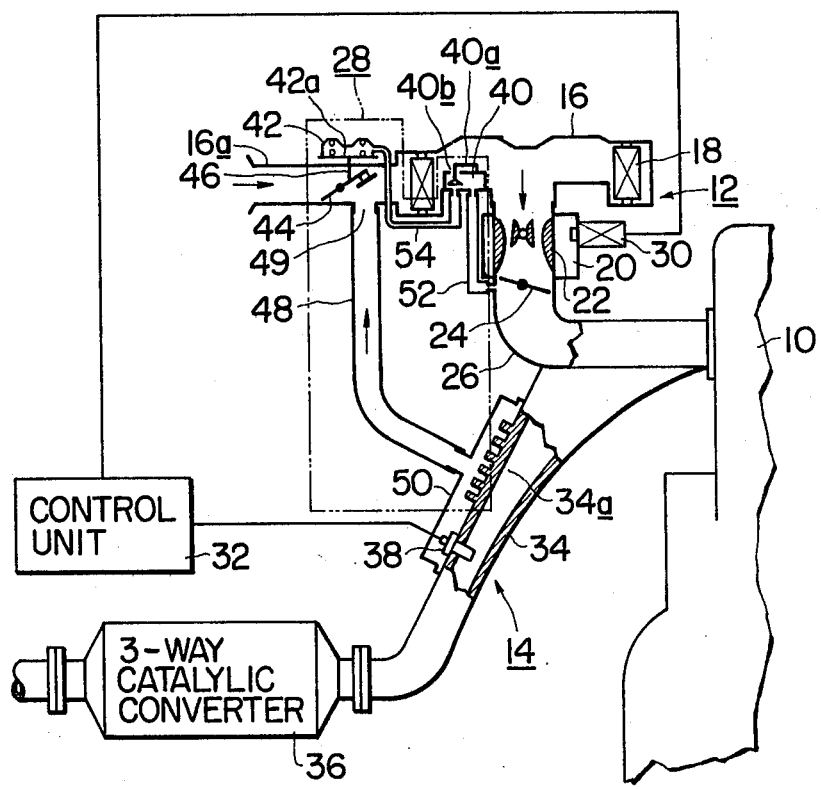

EXHAUST GAS PURIFYING SYSTEM

BACKGROUND OF THE INVENTION

The present invention relates in general to an exhaust gas purifying system for an internal combustion engine, and more particularly to a system comprising an electronically controlled fuel supply means operable to control an air-fuel ratio of the air-fuel mixture supplied into combustion chambers of the engine in accordance with the composition of the exhaust gases from the engine, an exhaust gas purifying device arranged in the exhaust system of the engine, and a thermostatically controlled air induction means mounted in the intake system of the engine for keeping the air entering the intake system at generally constant temperature.

It is recognized that a three-way catalytic converter comprising catalysts or a catalyst capable of converting harmful compounds such as hydrocarbons (HC), carbon monoxide (CO) and nitrogen oxides ($NO_x$) into harmless compounds performs at its maximum when the air-fuel mixture supplied into combustion chambers of the engine is kept within a close range of the stoichiometric air-fuel ratio. An electronically controlled fuel supply means has thus far proposed in the above-mentioned internal combustion engine system by reason of its increased accuracy in controlling the air-fuel ratio. This kind of a device is so called "feedback type air-fuel ratio controlling device", which can electronically control the amount of fuel or air to be introduced into engine so as to provide the engine with the air fuel mixture having stoichiometric air-fuel ratio by valving operation of an electric actuator operated in accordance with the composition of the exhaust gases from the engine.

This kind device has been proposed by the fact that the concentration of a certain compound in the exhaust gases closely depends on the actual air-fuel ratio of the mixture being supplied into the combustion chambers of the engine. An electronically controlled carburetor and an electronically controlled fuel injector which operate in accordance with the states of the exhaust gases are good examples of the feedback type air-fuel ratio controlling device.

In this kind device, it is usual to control the air-fuel ratio of the air-fuel mixture at its appropriate range, for example, within a range of 1/12 to 1/16.

Indeed, by controlling the air-fuel ratio within this range, unwanted disturbance made by unknown or uncontrolled factors to such device can be eliminated, so that increased driveability of the engine is obtained.

However, in this device, it is unwantedly happened that the air-fuel ratio of the mixture is compelled to deviate from the controlled range (1/12 to 1/16) when the temperature of air surrounding the device is extremely high. This effect is due to the fact that the density of air and the viscosity of fuel are compelled to sharply change with the change of their temperature.

Thus, when a three-way catalytic converter is employed in the exhaust gas purifying system including such device, the converter is prevented, by the abovementioned phenomenon, from making its effective performance. (It is recognized that the allowable error of the air-fuel ratio required by such kind converter is within about −0.3% to +0.3%.)

SUMMARY OF THE INVENTION

Therefore, a primary object of the present invention is to provide a new and improved exhaust gas purifying system which can eliminate the drawbacks accompanied by the conventional system as mentioned.

Another object of the present invention is to provide the improved exhaust gas purifying system which can increase the exhaust gas purifying efficiency of the exhaust gas purifying device mounted in the exhaust system of the internal combustion engine.

Still another object of the present invention is to provide the improved exhaust gas purifying system which has a device arranged to keep the air entering the intake system of the engine at generally constant temperature.

BRIEF DESCRIPTION OF THE DRAWING

Another objects and advantages of the present invention will become more apparent from following detailed description when taken together with the accompanying drawing, wherein a single FIGURE is a schematic view of an exhaust gas purifying system, according to the present invention, accompanied with an internal combustion engine.

DESCRIPTION OF THE PREFERRED EMBODIMENT

Referring now to the single FIGURE, there is shown an internal combustion engine 10 incorporating an intake system and an exhaust system which are generally designated by reference numerals 12 and 14, respectively.

The intake system 12 generally comprises an air filter 16 containing therein a filter element 18, an electronically controlled carburetor 20 having therein a venturi portion 22 and a throttle valve 24, and an intake tube 26. The air filter 16 is provided with a section of a thermostatically controlled air induction means, as generally indicated by phantom lines 28, which will be described hereinlater. The electronically controlled carburetor 20 includes an electric actuator 30 such as an electromagnetically controlled valve for controlling the amount of fuel passing through a fuel nozzle (not shown) in accordance with the instructions given by a control unit 32. The electric actuator 30 may be so arranged to control the amount of air to be mixed with the fuel, in an emulsion tube, passing through the fuel nozzle. Further, the electric actuator 30 may be either types of an ON-OFF operating valve, a servo-motor valve and a diaphragm valve.

The exhaust system 14 generally comprises an exhaust tube 34 having a section 34a incorporating the abovementioned thermostatically controlled air induction means 28, and a three-way catalytic converter 36 containing therein a catalyst or catalysts capable of converting hydrocarbons (HC), carbon monoxide (CO) and nitrogen oxides ($NO_x$) into harmless compounds.

Projected into the exhaust tube 34 at a position downstream of the section 34a and upstream of the three-way catalytic converter 36 is an exhaust gas sensor 38 such as an oxygen sensor which sends information signals about the exhaust gas oxygen concentration in the exhaust tube 34 to the control unit 32. The exhaust gas sensor 38 may be a hydrocarbon sensor, a carbon dioxide sensor, a carbon monoxide sensor or a nitrogen oxides sensor.

Now, the thermostatically controlled air induction means, generally surrounded by the phantom lines 28, comprises a temperature sensor unit 40 mounted in the body of the air filter 16 on the clean air side of the filter element 18, a vacuum diaphragm assembly 42 mounted on a snorkel tube 16a of the air filter 16, a damper door 44 connected to a diaphragm member 42a of the assembly 42 through a linkage 46, a heated air conduit 48 having one end connected to a branch opening 49 of the snorkel tube 16a, and a heat trapping case 50 connecting the other end of the heated air conduit 48 and surrounding the above-mentioned section 34a of the exhaust tube 34. The heat trapping case 50 is arranged to cover up the exhaust gas sensor 38, as shown. The temperature sensor unit 40 is fluidly connected to a base of the carburetor 20 and a vacuum chamber (no numeral) of the vacuum diaphragm assembly 42 through respective connecting tubes 52 and 54, so that when temperature of air surrounding the sensor unit 40 is below a predetermined value, the sensor unit 40 operates to supply vacuum created in the base of the carburetor 20 to the vacuum chamber, further when temperature of the air is above the predetermined value, the unit 40 operates to provide a vacuum leak against the vacuum supply into the vacuum chamber. In order to render the temperature sensor unit 40 to make abovementioned functions, temperature sensing spring such as a bimetal spring 40a is used in the unit 40. In this case, the bimetal spring 40a is so arranged to selectively open and close an opening 40b formed in a body member (no numeral) of the unit 40. In this embodiment, the unit 40 is so constructed that when the temperatures of air surrounding the unit 40 is below 38° C, the sensing spring 40a fully closes the opening 40b and when above 48° C, the sensing spring 40a fully opens the opening 40b. Thus, the temperature sensor unit 40 can regulate the amount of vacuum supplied to the vacuum chamber of the vacuum diaphragm assembly 42 depending on the temperature of the air passing through the body portion of the air filter 16.

With the above-stated constructions of the exhaust gas purifying system of the present invention, the operation is as follows.

When the exhaust gas sensor 38 senses a state of the exhaust gases wherein the concentration of the oxygen exceeds a predetermined level (this state is found when the air-fuel mixture introducing into each combustion chamber of the engine is leaner than stoichiometric), the control unit 32 issues an appropriate command signal to the electric actuator 30 so as to provide the carburetor 20 with richer air-fuel mixture. On the contrary, if the sensor 38 senses a state of the exhaust gases wherein the oxygen concentration is below the predetermined level (this state is found when the air-fuel mixture supplied to the engine is richer than stoichiometric), the control unit 32 issues another appropriate command signal to the electric actuator 30 to provide the carburetor 20 with leaner air-fuel mixture.

During the above-stated operation of the electronically controlled carburetor 20, the thermostatically controlled air induction means 28 operates as follows:

When the temperature of an intake air passing through the body portion of the air filter 16 is below 38° C, the temperature sensing spring 40a of the temperature sensor unit 40 completely closes the opening 40b thereby supplying the actual engine vacuum created in the base of the carburetor 20 to the vacuum chamber of the vacuum diaphragm assembly 42. Thus, in this instance, the damper door 44 is fully open allowing heated air from the heat trapping case 50 through the heated air conduit 48 to enter the air filter 16 and simultaneously the ambient air passing through the snorkel tube 16a to be shut off.

Further, when the temperature of the intake air is above 48° C, the sensing spring 40a completely opens the opening 40b for providing the engine vacuum leak. Thus, in this instance, the actual engine vacuum is not supplied into the vacuum chamber thereby causing the damper door 44 to stay at its home position wherein the passage for the heated air from the heat trapping case 50 is fully closed and simultaneously, the passage for the ambient air passing through the snorkel tube 16a is fully open allowing the ambient air to enter the air filter 16.

Furthermore, when the temperature of the intake air is within 38° C to 48° C, the damper door 44 is so actuated to stay its neutral position wherein both passages for the ambient air and the heated air are open thereby allowing these two types of air to be mixed and then to enter the air filter 16.

Therefore, the temperature of the intake air accordingly the temperature of the air-fuel mixture passing through the intake tube 26 of the engine is kept relatively constant regardless of the atmospheric temperature. Thus, the density of the intake air and the viscosity of the supplied fuel are kept constant during the engine operation, so that the prior-mentioned drawbacks, such as abnormal air-fuel ratio deviation, are not occurred.

Accordingly, the air-fuel ratio of the mixture supplied into the engine 10 is preferably controlled in the actual stoichiometric range thereby allowing the engine 10 and the three-way catalytic converter 36 to perform at their maximum.

With the above-stated system of the present invention, the following merits and advantages are further obtained.

(1) Since the electronically controlled carburetor is not influenced noticeably by the atmospheric temperature, it is possible to set the air-fuel mixture in a more limited range of the stoichiometric air-fuel ratio.

(2) Since the air-fuel mixture in the intake system of the engine is kept relatively warm, due to induction of the controlled warm air, even in a cold starting of the engine, the engine can quickly make its normal operation. Further, the exhaust gas sensor can also make its normal sensing operation in a relatively short period of time due to the heated exhaust gases from the quickly started engine.

Although, in the previous description, a three-way catalytic converter is employed, it is also possible to use in this system the other types of exhaust gas purifying devices such as an oxidizing converter, a reducing converter, and a thermal reactor. In these instances, however, the air-fuel ratio of the air-fuel mixture has to be so controlled to allow such devices to make their maximum performances in purifying the exhaust gases.

In conclusion, with the assistance of the thermostatically controlled air induction means, the feedback control performance of the electronically controlled fuel supply means is remarkably increased so that the exhaust gas purifying device employed in the exhaust system of the engine can perform at its maximum.

It is to be noted that the invention is not to be limited to the exact construction shown and described and that various changes and mofifications may be made without departing from the spirit and scope of the invention, as defined in the appended claims.

What is claimed is:

1. In an exhaust gas purifying system, for an internal combustion engine having an intake conduit system, an air-fuel mixture supplying means in the intake conduit system thereof of the type having an electric actuator connected to said air-fuel mixture supplying means, an exhaust gas sensor disposed in use in the exhaust conduit system of said engine, a control unit interposed between said electric actuator and said exhaust gas sensor for controlling said electric actuator upon receiving information signals from said exhaust gas sensor, to allow said air-fuel mixture supplying means to supply into said intake conduit system an air-fuel mixture having a desired air-fuel ratio, and an exhaust gas purifying device disposed in said exhaust conduit system at a position downstream of said exhaust gas sensor, the improvement comprising a thermostatically controlled air induction means mounted in use in said intake conduit system of said engine at a position upstream of said air-fuel mixture supplying means for supplying into said intake conduit system air having a relatively constant temperature, said thermostatically controlled air induction means comprising:

means defining a first passage for introducing into said intake conduit system ambient air;

a case surrounding a portion of said exhaust conduit system and spaced therefrom;

means defining a second passage for introducing into said intake conduit system heated air in said case, said first and second means being joined to each other;

mixing means for mixing said ambient air and said heated air to maintain the air thus mixed at said relatively constant temperature, and said case being arranged to cover up said exhaust gas sensor.

* * * * *